(12) United States Patent
Berglöw

(10) Patent No.: US 7,207,755 B2
(45) Date of Patent: Apr. 24, 2007

(54) TOOL ARRANGEMENT AND TOOL FOR CHIP REMOVAL

(75) Inventor: Karl-Erik Berglöw, Fagersta (SE)

(73) Assignee: Seco Tools AB, Fagesta (SE)

( * ) Notice: Subject to any disclaimer, the term of this patent is extended or adjusted under 35 U.S.C. 154(b) by 85 days.

(21) Appl. No.: 10/921,117

(22) Filed: Aug. 19, 2004

(65) Prior Publication Data

US 2005/0079020 A1 Apr. 14, 2005

(30) Foreign Application Priority Data

Aug. 28, 2003 (SE) .................................. 0302318

(51) Int. Cl.
*B23B 51/06* (2006.01)
*B23Q 11/10* (2006.01)

(52) U.S. Cl. .................. 409/232; 409/136; 408/59; 408/226; 407/11

(58) Field of Classification Search .................. 408/57, 408/59, 226, 239 R, 231, 233; 407/11; 409/136, 409/137, 135, 131, 232, 234
See application file for complete search history.

(56) References Cited

U.S. PATENT DOCUMENTS

| | | | | |
|---|---|---|---|---|
| 365,744 A * | 6/1887 | Heyer | ........................ | 408/57 |
| 2,335,741 A * | 11/1943 | Contaldi | ...................... | 408/222 |
| 2,556,745 A * | 6/1951 | Zimmermann | ............... | 408/59 |
| 2,847,885 A * | 8/1958 | Wagner | ........................ | 408/59 |
| 3,313,186 A * | 4/1967 | Rochon | ...................... | 76/108.1 |
| 3,994,615 A * | 11/1976 | Narang | ........................ | 408/226 |
| 4,762,444 A * | 8/1988 | Mena | ............................ | 408/59 |
| 4,850,759 A * | 7/1989 | Strand et al. | ........... | 408/239 A |
| 4,958,965 A * | 9/1990 | Strand et al. | ............... | 408/226 |
| 5,599,145 A * | 2/1997 | Reinauer et al. | ............ | 408/233 |
| 5,607,263 A * | 3/1997 | Nespeta et al. | ............. | 408/227 |
| 5,851,094 A * | 12/1998 | Strand et al. | ............... | 409/234 |
| 6,045,305 A * | 4/2000 | Plummer | ...................... | 408/230 |
| 6,065,908 A * | 5/2000 | Kleine et al. | ................. | 408/67 |
| 6,273,650 B1 * | 8/2001 | Jordberg | ..................... | 407/102 |
| 6,540,452 B1 * | 4/2003 | Bolkart et al. | .............. | 408/230 |
| 6,821,061 B2 * | 11/2004 | Frejd | ........................... | 408/59 |

FOREIGN PATENT DOCUMENTS

EP 1224994 A2 * 7/2002
JP 64-2807 A * 1/1989

* cited by examiner

*Primary Examiner*—Erica Cadugan
(74) *Attorney, Agent, or Firm*—WRB-IP LLP

(57) ABSTRACT

In a cutting tool arrangement and a tool for chip removing machining, the cutting tool arrangement comprises a tool, fastening arrangement, and a shank. The tool is a one-piece unit. The axial channel is of non-circular cross-section to provide a key grip. An end of the axial channel comprises material at least partly blocking the axial channel.

14 Claims, 3 Drawing Sheets

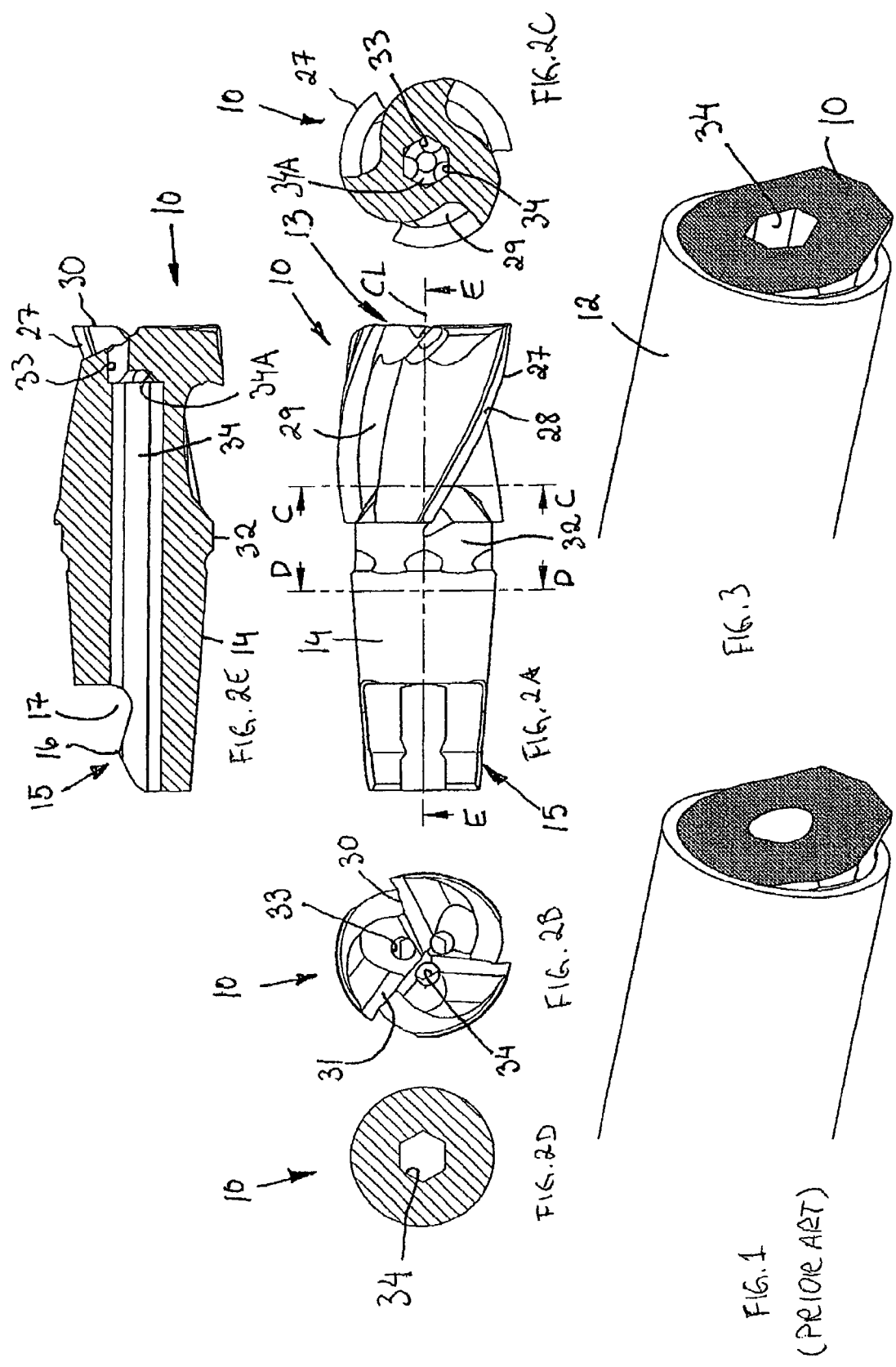

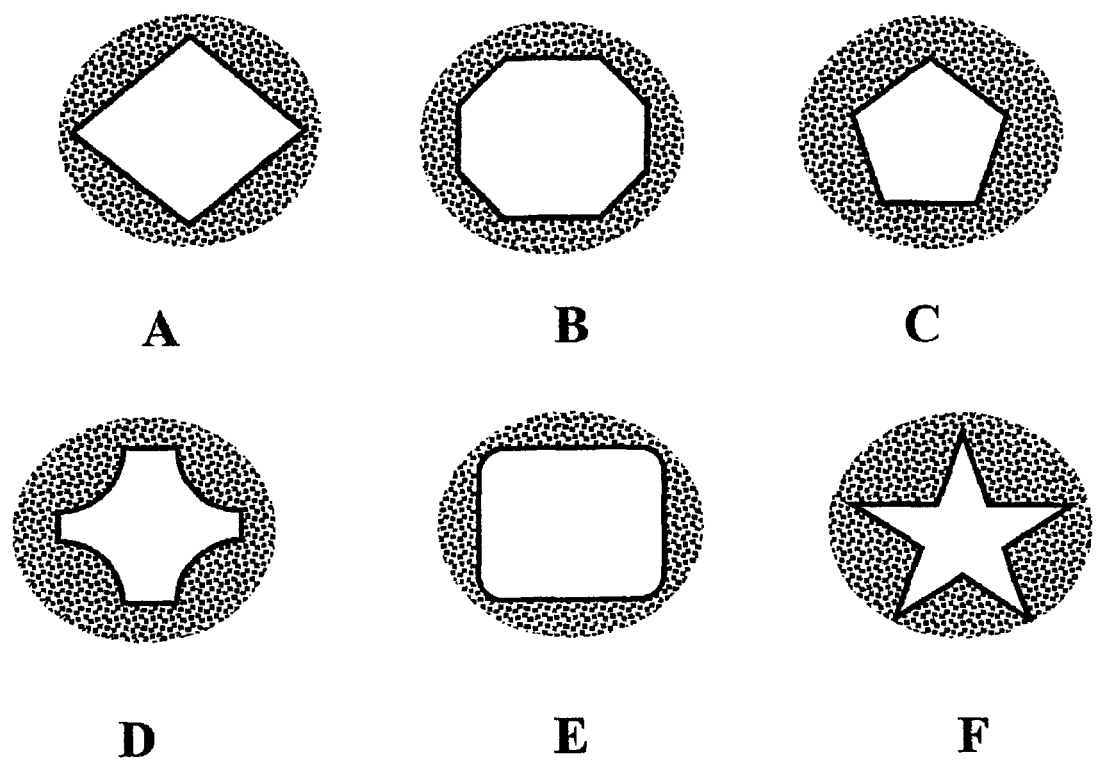
FIG. 4
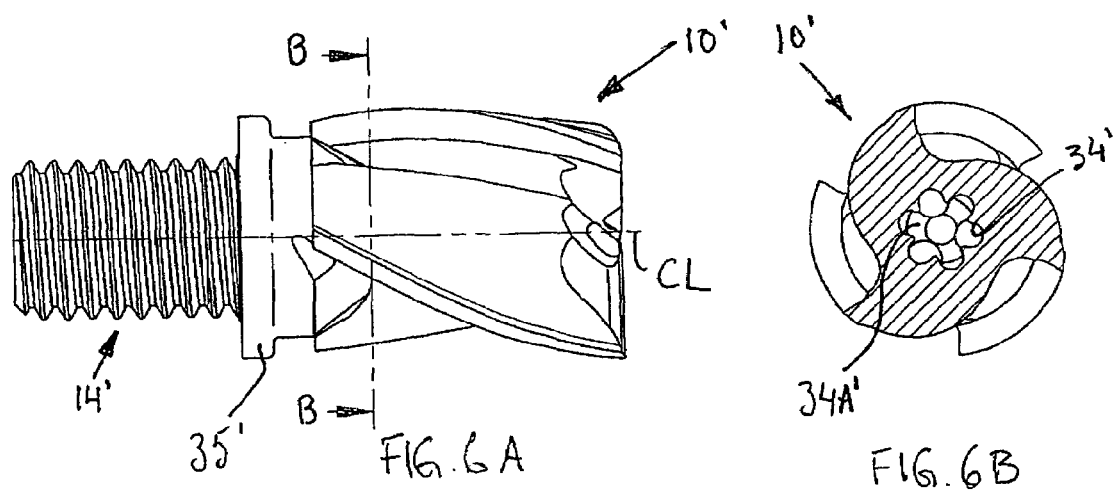

TOOL ARRANGEMENT AND TOOL FOR CHIP REMOVAL

The present application claims priority of SE 0302318-1, filed in Sweden on Aug. 28, 2003, and which is incorporated by reference.

The present invention relates to a tool arrangement and a tool for rotary chip removal machining.

It is previously known through applicants U.S. Pat. No. 4,850,759 to provide a solution to the problem of providing milling and drilling tools in small dimensions with interchangeable cutting edges. EP-B1-942798 discloses a milling or drilling tool that if breakage occur, such as shown in FIG. 1 below, the tool becomes difficult to replace. The breakage of FIG. 1 leaves very little material for a wrench to grip for replacing the tool. Another tool in this area is disclosed in U.S. Pat. No. 6,273,650.

The inventor has recognized that it is desirable to provide a tool arrangement and a tool that is easy to loosen even if the tool is broken. The inventor has also recognized that it is desirable to provide a tool arrangement and a tool which has good cooling.

In accordance with an aspect of the present invention, a cutting tool arrangement for chip removing machining includes a tool, a fastening arrangement, and a shank. The tool has an axial channel. The tool is a one-piece unit. The axial channel is of non-circular cross-section to provide a key grip and an end of the axial channel comprises material at least partly blocking the axial channel.

In accordance with another aspect of the present invention, a tool for chip removing machining includes fastening structure and an axial channel. The tool is a one-piece unit. The axial channel is of non-circular cross-section to provide a key grip and an end of the axial channel comprises material at least partly blocking the axial channel.

BRIEF DESCRIPTION OF THE DRAWINGS

Below embodiments of the present invention will be described with reference to the enclosed drawings, wherein FIG. 1 shows a prior art tool arrangement having a broken tool in a perspective view;

FIGS. 2A and 2B show side and top views of a tool according to the present invention;

FIGS. 2C, 2D and 2E show cross-sections according to the lines C—C, D—D and E—E, respectively, in FIG. 2A;

FIG. 3 shows a tool arrangement according to the present invention having a broken tool in a perspective view;

FIGS. 4A–4F show alternative cross-sections for a flushing channel in the tool;

FIGS. 6A and 6B show an alternative embodiment of a tool according to the present invention in a side view and in a cross-section along the line B—B in FIG. 6A, respectively.

DETAILED DESCRIPTION OF THE INVENTION

Figure 5:
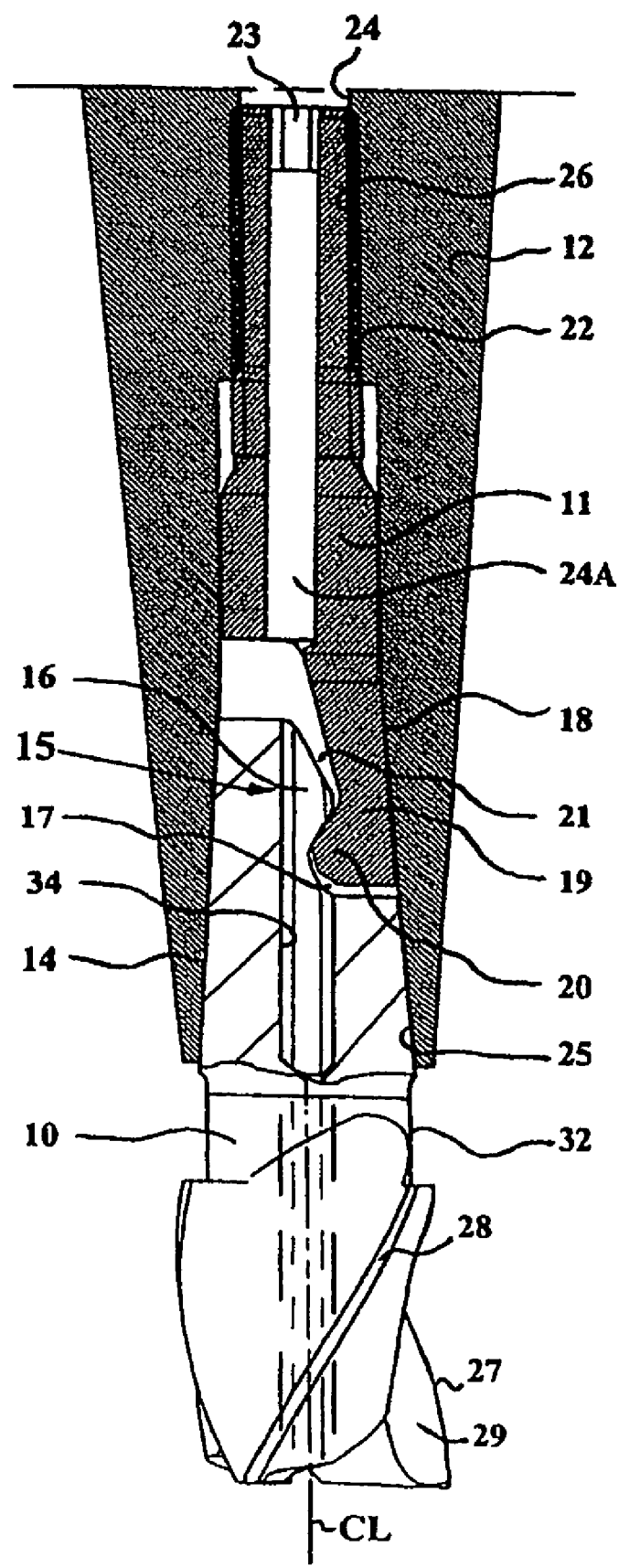
FIG. 5 shows the tool arrangement according to the present invention in cross-section.

The embodiment of a tool arrangement according to the present invention shown in FIG. 5 comprises a tool 10, a locking screw 11 as well as a shank 12. The tool arrangement comprises an axial channel, which extends beyond hook-shaped means 15, 19 on the tool arrangement and the locking screw, respectively. The channel runs through the hook-shaped means 15 of the tool, but preferably does not extend through the hook-shaped means 19 of the locking screw. The main function of the axial or central channel 34 is to constitute a key grip in a broken tool. The channel may also transfer flush medium to main and/or minor cutting edges 27, 30 and diminish the masses of the means. The channel breaks through border surfaces of the hook-shaped means 15 of the tool and the channel occupies, in the area of the hook-shaped means, a bigger space in the tool than in the locking screw. In this manner the center of gravity in the area of the hook-shaped means, is displaced closer to the axis CL of rotation of the tool arrangement, and therefore the tool arrangement becomes dynamically centered. The asymmetrical means 15 of the material with highest density comprises a mass diminishing recess.

The tool 10 is a one-piece unit and is provided with at least one cutting edge at the end 13 facing away from the shank 12, which is given different design depending on the area of application. A preferred shape of the forward end of the tool 10 is shown in detail in FIGS. 2A, 2B and 2E. The tool 10 is performed in hard material, preferably cemented carbide and comprises three screw-shaped first cutting edges or major cutting edges 27. The number of major cutting edges may alternatively be one, two or four to six. Each major cutting edge 27 is formed along the intersection line of a clearance surface or protruding land 28 and a chip surface or chip flute 29. The major cutting edges 27 lie in a common, imaginary cylinder, which is concentric with the axis CL of rotation of the tool and of the tool arrangement. Each chip flute 29 is concavely formed and extends from a connected second cutting edge or minor cutting edge 30 in direction axially inwardly from a bevel or a free end 13 of the tool. The minor cutting edge 30 is formed at the intersection of the chip flute 29 and an end surface 31 and essentially has a radial extension inwards from the imaginary cylinder, whereof one cutting edge 30, see FIG. 2B, substantially connects to the axis of rotation CL of the tool such that the tool can be able to drill downwards into the work piece during milling. Each pair of major and minor cutting edges is fed with flush medium via a hole 33. The three holes 33 are arranged suitably symmetrical about the axis of rotation of the tool. The holes connect to a central channel 34, which terminates in the area of the other free end of the tool. The channel 34 is of non-circular cross-section forming a non-circular space as seen in the cross-section of FIG. 2B to provide a key grip. In this embodiment it is of hexagonal shape. At least the cutting edge 30 intersects an imaginary extension of the non-circular axial channel 34, which means that there is provided perforated cemented carbide material axially in front of the channel 34. The tool is provided with three cutting edges 30, which are integral with the tool. The tool has three chip flutes 29. Each cutting edge 30 is fed with flush medium via a hole 33 connected to the axial channel 34, thereby providing three holes 33 terminating at a first free end 13 of the tool. The holes 33 intersect the central channel 34. The non-circular central channel 34 terminates axially distant from the first free end 13 of the tool 10. An end 34A, 34A' of the axial channel 34, 34' comprises material at least partly blocking the axial channel.

FIGS. 4A–4F show several alternative cross-sections for the flushing channel in the tool, such as a diamond, an octagon, a pentagon, a Phillips cross-section, a square and a five-armed star.

At the end facing towards the shank 12 the tool is provided with a first conical portion 14, which is provided with a first means for engagement 15, which in the shown embodiment comprises a first lip 16 as well as a first recess 17. The intermediate portion of the tool 10 is provided with a key grip 32, the application of which is explained below.

The locking screw 11, which preferably is performed in steel, has a second conical portion 18 at the end facing towards the tool, which is provided with a second means for engagement 19, which is intended to cooperate with the first means for engagement 15. Such as shown in FIG. 5 the provision of the second means for engagement 19 implies that a substantial part of the second conical portion 18 has been removed. The second means for engagement 19 comprises a second lip 20 as well as a second recess 21. In active position the first lip 16 cooperates with the second recess 21 and the second lip 20 with the first recess 17. The second lip 20 is preferably intact, that is, no recess for flush medium is made in this lip, and therefore the mass in the second means for engagement 19 is relatively alike as that of the first means for engagement 15 such that wobbling is substantially avoided.

Axially inside the second means for engagement 19, in the axial direction, the locking screw 11 has an externally threaded, preferably cylindrical portion 22. An Allen key grip 23 is provided at the axially innermost end of the locking screw 11, whereby loosening or tightening of the locking screw 11 is made possible through the internal channel 24 of the shank 12. Normally however, tightening or loosening of the locking screw is accomplished through the external key grip 32. Preferably, the same key fits the apertures 34 and 23. Alternatively the thread 26 may be arranged at an end of a releaseable sleeve, the other end of which then is provided with an external thread as well as a key grip.

The shank 12 is provided with a conical seat 25 at the end facing towards the tool 10, which receives the first and second conical portions 14 and 18 of the tool 10 and the locking screw 11, respectively. Inside the conical seat 25 the shank 12 has a substantially cylindrical, internally threaded portion 26, which cooperates with the external threaded portion 22 of the locking screw 11. The portion 26 is situated axially outside of the above-mentioned channel 24.

Mounting and dismounting of one embodiment of the tool arrangement is more closely described in U.S. Pat. No. 4,850,759. Cooperation between the external thread 22 and the internal thread 26 axially displace the locking screw 11 and thereby also the tool 10 into the shank 12 until the cone-shaped portion 14 comes into abutment with the conical seat 25, i.e. the position according to FIG. 5 has been achieved. The tool 10 is now anchored in the shank 12 in a satisfactorily manner. Thereby a through the tool arrangement going channel for flush medium has been formed via the recesses 24, 24A, 34 and 33.

The threads 22 and 26 are performed as right-hand threads at tool arrangements for right-hand cutting and as left-hand threads at tool arrangements for left-hand cutting.

For the above-described embodiment the cone angle for the tool and seat should be less than 25° and 0° for a cylindrical shaft. In addition shall be pointed out that the described embodiment relates to milling or drilling tool arrangements, i.e. tool arrangements which rotate about their longitudinal center axes. Milling cutters with small cutting portions are expected to be the first area of application for the present invention but also drilling tool arrangements fall within the scope of the invention.

Alternatively, the tool can have a cylindrical shaft having an internal (not shown) or an external thread 14' as a fastening means as shown in the tool 10' of FIGS. 6A and 6B that replaces the conical portion 14. Preferably, the thread 14' ends at a shoulder 35'. The cross-section of the channel 34' is for a key of the trade mark Torx® (registered trade mark of Camcar Textron).

The axial length of the channel 34, 34' should be enough to reach the presumed breakage area often at the vicinity of the shank 12 free end. Stated another way, the length towards the free end 13 of the channel 34, 34' is determined by material 34A, 34A' blocking the channel.

If the tool breaks as shown in FIG. 1 there will be no chance of dismounting the tool arrangement having the shank still held in the machine but instead the entire tool arrangement has to be dismounted leading to an unnecessary standstill. By constructing the tool 10, 10' with a non-circular central channel 34 a key can be entered to rotate the tool relative to the shank 12. Thereby, the tool can be easily replace.

The invention is no way limited to the above-described embodiments but may freely varied within the limits of the subsequent claims.

The invention claimed is:

1. A milling or drilling cutting tool arrangement for chip removing machining comprising a tool, a threaded fastening arrangement, and a shank to which the tool is fastenable by the fastening arrangement, the tool having an axial channel, the tool being a one-piece unit, wherein the axial channel is of non-circular cross-section to provide a key grip and an end of the axial channel comprises material at least partly blocking the axial channel, wherein the tool includes at least three cutting edges, at least three chip flutes, and at least three holes terminating at a first free end of the tool, the holes intersecting the axial channel, and wherein each cutting edge is fed with flush medium via a respective one of the at least three holes.

2. The cutting tool arrangement according to claim 1, wherein the channel is adapted for transferring flush medium to the holes and one of the cutting edges connects substantially to the axis of rotation of the tool.

3. The cutting tool arrangement according to claim 2, wherein at least one of the cutting edges intersects an imaginary extension of the axial channel.

4. The cutting tool arrangement according to claim 1, wherein the axial channel is of hexagonal shape.

5. The cutting tool arrangement according to claim 1, wherein the at least three cutting edges are integral with the tool.

6. The cutting tool arrangement according to claim 1, wherein the axial channel terminates axially distant from a first free end of the tool.

7. The cutting tool arrangement according to claim 1, comprising an external key grip on the tool and wherein, in event of breakage of the tool at a point between the external key grip and the shank, the tool and the threaded fastening arrangement are adapted to be turned relative to the shank by a key extending into the axial channel from a broken end of the tool.

8. A milling or drilling tool for chip removing machining comprising a threaded fastening structure for fastening the tool to a shank having corresponding threads, the tool having an axial channel, the tool being a one-piece unit, wherein the axial channel is of non-circular cross-section to provide a key grip and an end of the axial channel comprises material at least partly blocking the axial channel, wherein the tool includes at least three cutting edges, at least three chip flutes, and at least three holes terminating at a first free end of the tool, the holes intersecting the axial channel, wherein each cutting edge is fed with flush medium via a hole connected to the axial channel.

9. The tool according to claim 8, wherein the axial channel is adapted for transferring flush medium to the holes and one of the cutting edges connects substantially to the axis of rotation of the tool.

10. The tool according to claim 8, wherein at least one of the cutting edges intersects an imaginary extension of the axial channel.

11. The tool according to claim 8, wherein the axial channel is of hexagonal shape.

12. The tool according to claim 8, wherein the at least three cutting edges are integral with the tool.

13. The tool according to claim 8, wherein the axial channel terminates axially distant from a first free end of the tool.

14. The cutting tool arrangement according to claim 8, comprising an external key grip on the tool and wherein, in event of breakage of the tool at a point between the external key grip and the shank, the tool and the threaded fastening arrangement are adapted to be turned relative to the shank by a key extending into the axial channel from a broken end of the tool.

* * * * *